US010000097B2

(12) United States Patent
Kim et al.

(10) Patent No.: US 10,000,097 B2
(45) Date of Patent: Jun. 19, 2018

(54) ELECTROSTATIC ENERGY GENERATOR USING TIRE CORD FABRIC

(71) Applicant: RESEARCH & BUSINESS FOUNDATION SUNGKYUNKWAN UNIVERSITY, Suwon-si (KR)

(72) Inventors: Sang Woo Kim, Yongin-si (KR); Wanchul Seung, Yongin-si (KR); Ju-Hyuck Lee, Suwon-si (KR); Keun Young Lee, Suwon-si (KR); Sung Soo Kwak, Seongnam-si (KR); Tae Yun Kim, Incheon (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 337 days.

(21) Appl. No.: 14/829,863

(22) Filed: Aug. 19, 2015

(65) Prior Publication Data

US 2016/0159170 A1 Jun. 9, 2016

(30) Foreign Application Priority Data

Dec. 3, 2014 (KR) ........................ 10-2014-0172027

(51) Int. Cl.
*B60C 23/04* (2006.01)
*H02N 1/04* (2006.01)
(Continued)

(52) U.S. Cl.
CPC ............ *B60C 23/041* (2013.01); *B60C 9/005* (2013.01); *B60C 9/1807* (2013.01); *B60C 19/00* (2013.01);
(Continued)

(58) Field of Classification Search
CPC ... B60C 23/041; B60C 23/04; B60C 23/0408; H02N 1/04; D03D 1/0088
See application file for complete search history.

(56) References Cited

U.S. PATENT DOCUMENTS

| 423,708 | A | * | 3/1890 | Tirmann | ................. H02N 1/04 15/1.51 |
| 6,807,853 | B2 | * | 10/2004 | Adamson | ............ B60C 23/0411 73/146 |

(Continued)

FOREIGN PATENT DOCUMENTS

| JP | 2006-223054 A | 8/2006 | |
| WO | WO 2016028667 A1 | * 2/2016 | ............... H02N 1/04 |

OTHER PUBLICATIONS

Fan, Feng-Ru, et al. "Transparent triboelectric nanogenerators and self-powered pressure sensors based on micropatterned plastic films." *Nano letters* 12.6 (2012): 3109-3114.

(Continued)

*Primary Examiner* — Edgardo San Martin
(74) *Attorney, Agent, or Firm* — NSIP Law

(57) ABSTRACT

An electrostatic energy generator may include one or more first tire cord fabrics each including a conductive material which is a wire-shaped electrode and a non-conductive material, the non-conductive material configured to surround an outer peripheral surface of the conductive material, and one or more second tire cord fabrics each including a conductive material which is a wire-shaped electrode, and a material configured to surround an outer peripheral surface of the conductive material that is different from the non-conductive material of the first tire cord fabric, wherein the first tire cord fabric and the second tire cord fabric are arranged in a longitudinal direction so as to be in contact with each other and form a bundle, such that frictional
(Continued)

electricity is generated due to a friction between the first tire cord fabric and the second tire cord fabric.

15 Claims, 4 Drawing Sheets

(51) Int. Cl.
   *B60C 9/00* (2006.01)
   *B60C 19/00* (2006.01)
   *B60C 99/00* (2006.01)
   *B60C 9/18* (2006.01)
   B60C 23/02 (2006.01)
   H02N 1/00 (2006.01)

(52) U.S. Cl.
   CPC ............. *B60C 99/00* (2013.01); *H02N 1/04* (2013.01); *B60C 2009/0071* (2013.01)

(56) References Cited

U.S. PATENT DOCUMENTS

| | | | | |
|---|---|---|---|---|
| 7,549,327 | B2* | 6/2009 | Breed | B60C 23/041 |
| | | | | 73/146 |
| 8,074,507 | B2* | 12/2011 | Schrabler | B60C 23/041 |
| | | | | 73/146.5 |
| 8,365,589 | B2* | 2/2013 | Schreiner | B60C 23/041 |
| | | | | 73/146.5 |
| 9,000,923 | B2* | 4/2015 | Benedict | B60C 23/007 |
| | | | | 340/10.1 |
| 2006/0090835 | A1* | 5/2006 | Mancosu | B60C 23/04 |
| | | | | 156/110.1 |
| 2008/0202657 | A1* | 8/2008 | Hammel | B60C 23/0408 |
| | | | | 152/152.1 |
| 2015/0035408 | A1* | 2/2015 | Despesse | H02N 1/08 |
| | | | | 310/310 |
| 2015/0061460 | A1* | 3/2015 | Bae | H02N 1/04 |
| | | | | 310/310 |
| 2015/0194911 | A1* | 7/2015 | Kim | H02N 1/04 |
| | | | | 310/310 |
| 2016/0036351 | A1* | 2/2016 | Kim | H02N 1/04 |
| | | | | 73/514.32 |
| 2016/0156282 | A1* | 6/2016 | Kim | H02N 1/04 |
| | | | | 607/61 |
| 2016/0294305 | A1* | 10/2016 | Kim | H02N 1/04 |
| 2016/0315561 | A1* | 10/2016 | Shin | H02N 1/04 |
| 2016/0336505 | A1* | 11/2016 | Arizumi | H01L 41/113 |
| 2016/0359429 | A1* | 12/2016 | Byun | H02N 1/04 |
| 2016/0373028 | A1* | 12/2016 | He | H02N 1/04 |
| 2017/0033291 | A1* | 2/2017 | Lee | H01L 51/0048 |
| 2017/0077838 | A1* | 3/2017 | Wang | H02N 1/04 |
| 2017/0160817 | A1* | 6/2017 | Wang | G06F 3/023 |
| 2017/0237365 | A1* | 8/2017 | Kwon | H02N 1/04 |
| | | | | 310/310 |

OTHER PUBLICATIONS

Zhong, Junwen, et al. "Fiber-based generator for wearable electronics and mobile medication." *ACS nano* 8.6 (2014): 6273-6280.

* cited by examiner

Deformation Of Tire According To Load

ELECTROSTATIC ENERGY GENERATOR USING TIRE CORD FABRIC

CROSS-REFERENCE TO RELATED APPLICATION(S)

This application claims priority to and the benefit under 35 USC 119(a) of Korean Patent Application No. 10-2014-0172027, filed on Dec. 3, 2014, in the Korean Intellectual Property Office, the entire disclosure of which is incorporated herein by reference for all purposes.

BACKGROUND

1. Field

The present application relates to an electrostatic, i.e., triboelectric, energy generator using a tire cord fabric, a tire cord including the electrostatic energy generator, and a tire including the tire cord.

According to embodiments of the present application, disclosed herein is a device capable of generating electrical energy using mechanical energy by capturing energy generated by a deformation of a tire within which the electrostatic energy generator is incorporated.

2. Description of Related Art

Vehicles commonly drive using a fossil fuel or using electrical energy. Such vehicles, including automobiles, require energy to operate a drive system, and thus determining how the vehicles can efficiently drive using a small amount of energy for a long time is of great interest. Conventionally, the vehicles can store only a limited amount energy (e.g., fossil energy, electrical energy, or hydrogen energy), and are limited in that they can drive only by the amount of the stored energy. Particularly, in the case of vehicles using electrical energy, the vehicles have a limited mileage due to limitations of storage and charging.

In general, in the vehicles, tires are mounted on the outer circumference of wheels in order to maintain a grounding force with a road surface during driving, and thus the tires may absorb the impact of an uneven road surface or of loads generated in the vehicles. That is, the tires, which are attached to the wheels of the vehicle and made of a material such as rubber, are parts which are continuously deformed according to a shape of the ground since the tires are in direct contact with the ground during the rotation of the wheels.

In general, a road is a smooth asphalt road. However, uneven surfaces such as speed bumps can exist in the middle of a road, and a vehicle may also drive on an unpaved road.

It is natural for tires to be deformed no matter how smooth a road surface is due to the weight of a vehicle. The tires may be further deformed on a speed bump or the unpaved road.

Such deformation of tires continuously occurs during the driving of a vehicle. When the mechanical energy generated by the deformation of the tires is used, the mechanical energy can be converted into electrical energy, and the electrical energy can be harvested.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electrostatic energy generator may include one or more first tire cord fabrics each including a conductive material which is a wire-shaped electrode and a non-conductive material, the non-conductive material configured to surround an outer peripheral surface of the conductive material, and one or more second tire cord fabrics each including a conductive material which is a wire-shaped electrode, and a material configured to surround an outer peripheral surface of the conductive material that is different from the non-conductive material of the first tire cord fabric, wherein the first tire cord fabric and the second tire cord fabric are arranged in a longitudinal direction so as to be in contact with each other and to form a bundle, such that frictional electricity is generated due to a friction between the first tire cord fabric and the second tire cord fabric.

The generator may be configured such that the first tire cord fabric and the second tire cord fabric are twisted in the bundle.

The generator may be configured such that any one of the first tire cord fabric and the second tire cord fabric is disposed on a center of the bundle and the other tire cord fabric is disposed on a circumference thereof, such that the tire cord fabrics disposed on the circumference are disposed so as to surround the tire cord fabrics thereinside.

The generator may include a plurality of bundles, such that frictional electricity is generated due to a friction between the first tire cord fabric and the second tire cord fabric and a friction between the bundles of the plurality of bundles.

The generator may be configured such that the bundles of the plurality of bundles are twisted with each other.

The generator may be configured such that in the plurality of bundles, each of the bundles is made of only any one of the first tire cord fabric and the second tire cord fabric.

The generator may be configured such that in the plurality of bundles, each of the bundles is made of tire cord fabrics which are different from each other.

In another general aspect, an electrostatic energy generator may include one or more first tire cord fabrics each including a conductive material which is a wire-shaped electrode and a non-conductive material, the non-conductive material configured to surround an outer peripheral surface of the conductive material; and one or more second tire cord fabrics each including a conductive material which is a wire-shaped electrode, wherein the first tire cord fabric and the second tire cord fabric are arranged in a longitudinal direction so as to be in contact with each other and to form a bundle, such that frictional electricity is generated due to a friction between the first tire cord fabric and the second tire cord fabric.

The generator may be configured such that the first tire cord fabric and the second tire cord fabric are twisted in the bundle.

The generator may be configured such that any one of the first tire cord fabric and the second tire cord fabric is disposed on a center of the bundle and the other tire cord fabric is disposed on a circumference thereof, such that the tire cord fabrics disposed on the circumference are disposed so as to surround the tire cord fabrics thereinside.

The generator may include a plurality of bundles, such that frictional electricity is generated due to a friction between the first tire cord fabric and the second tire cord fabric and a friction between the bundles of the plurality of bundles.

The generator may be configured such that the bundles of the plurality of bundles are twisted with each other.

The generator may be configured such that, in the plurality of bundles, each of the bundles is made of only one of the first tire cord fabric and the second tire cord fabric.

The generator may be configured such that, in the plurality of bundles, each of the bundles is made of tire cord fabrics which are different from each other.

In another general aspect, a tire cord may include an electrostatic energy generator including one or more first tire cord fabrics each including a conductive material which is a wire-shaped electrode and a non-conductive material, the non-conductive material configured to surround an outer peripheral surface of the conductive material, and one or more second tire cord fabrics each including a conductive material which is a wire-shaped electrode, and a material configured to surround an outer peripheral surface of the conductive material that is different from the non-conductive material of the first tire cord fabric, wherein the first tire cord fabric and the second tire cord fabric are arranged in a longitudinal direction so as to be in contact with each other and to form a bundle, such that frictional electricity is generated due to a friction between the first tire cord fabric and the second tire cord fabric.

In another general aspect, a tire may include a tire cord a tire cord which includes an electrostatic energy generator including one or more first tire cord fabrics each including a conductive material which is a wire-shaped electrode and a non-conductive material, the non-conductive material configured to surround an outer peripheral surface of the conductive material, and one or more second tire cord fabrics each including a conductive material which is a wire-shaped electrode, and a material configured to surround an outer peripheral surface of the conductive material that is different from the non-conductive material of the first tire cord fabric, wherein the first tire cord fabric and the second tire cord fabric are arranged in a longitudinal direction so as to be in contact with each other and to form a bundle, such that frictional electricity is generated due to a friction between the first tire cord fabric and the second tire cord fabric.

In another general aspect, a tire pressure measurement sensor may include a tire including a tire cord which includes an electrostatic energy generator including one or more first tire cord fabrics each including a conductive material which is a wire-shaped electrode and a non-conductive material, the non-conductive material configured to surround an outer peripheral surface of the conductive material, and one or more second tire cord fabrics each including a conductive material which is a wire-shaped electrode, and a material configured to surround an outer peripheral surface of the conductive material that is different from the non-conductive material of the first tire cord fabric, wherein the first tire cord fabric and the second tire cord fabric are arranged in a longitudinal direction so as to be in contact with each other and to form a bundle, such that frictional electricity is generated due to a friction between the first tire cord fabric and the second tire cord fabric, wherein electric energy generation signals generated from the electrostatic energy generator are collected during a driving of the tire, and wherein an air pressure of the tire is determined to be normal or not normal.

In another general aspect, a method of generating electrostatic energy, may include surrounding an outer peripheral surface of a conductive material, which is a wire-shaped electrode, with a non-conductive material, together the conductive material and the non-conductive material included in one or more first tire cord fabric, and surrounding an outer peripheral surface of a conductive material, which is a wire-shaped electrode, with a non-conductive material, which is different from the non-conductive material of the first tire cord fabric, together the conductive material and the non-conductive material that is different from the non-conductive material of the first tire cord fabric included in one or more second tire cord fabric, wherein the first tire cord fabric and the second tire cord fabric are arranged in a longitudinal direction so as to be in contact with each other and to form a bundle, such that frictional electricity is generated due to a friction between the first tire cord fabric and the second tire cord fabric.

Other features and aspects will be apparent from the following detailed description, the drawings, and the claims.

BRIEF DESCRIPTION OF THE DRAWINGS

The above and other objects, features and advantages of the present application will become more apparent to those of ordinary skill in the art by describing in detail embodiments thereof with reference to the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In embodiments of the present application, a tire cord fabric may refer to fabric plies used to make a tire cord. The fabric plies may refer to a fabric having a long shape, such as a pipe or wire shape. Here, the fabric may refer to a very thin and long structure. The tire cord fabric plies may be twisted or spun and woven to form the tire cord.

Figure 1:
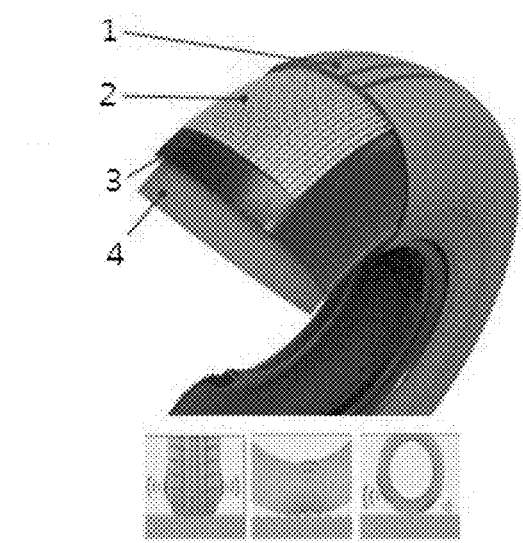
FIG. 1 is a view illustrating an example of a tire to which an electrostatic energy generator using a tire cord fabric is applied.

FIG. 1 is a view illustrating an example of a tire to which an electrostatic energy generator using a tire cord fabric is applied.

As illustrated in FIG. 1, a structure of the tire including the tire cord to which the electrostatic energy generator is applied includes a tread 1 in contact with the ground, a tire cord 2 formed inside the tread, radial plies 3 formed inside the tire cord, and an inner liner 4 formed inside the radial plies. In general, a tire uses the tire cord inside a carcass to maintain a form of the tire and to absorb pressure and impact generated from the outside. The tire cord is used as a reinforcement material for extending a lifetime of the tire. The electrostatic energy generator according to an embodiment of the present application is included in the tire cord. FIG. 1 further depicts a deformation of a tire according to an applied load.

Figure 2:
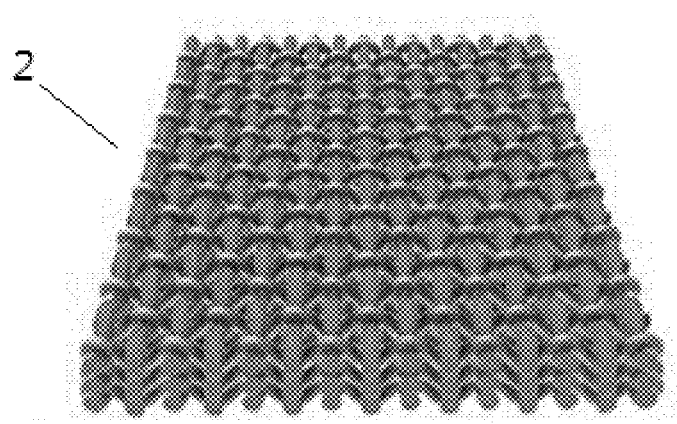
FIG. 2 is a view illustrating an example of a tire cord to which an electrostatic energy generator is applied.

FIG. 2 is a view illustrating an example of a tire cord to which an electrostatic energy generator is applied.

As illustrated in FIG. 2, the tire cord 2 has a sheet shape as a whole, in which a plurality of tire cord fabrics are twisted. The tire cord 2 is a cord in which the tire cord fabrics are twisted or spun and woven. The tire cord fabrics refer to fabric plies used to make the tire cord, and the fabric plies refer to a fabric having a long shape such as a pipe or wire shape. It may be seen that each of the tire cord fabrics has a long wire or pipe shape, as illustrated in FIGS. 3 to 5 below. Various twisting methods, such as a double twisting, a single twisting, a special twisting, a decorative twisting, or the like, may be applied according to a particular need. That is, a method of twisting the fabrics may be applied such that friction may occur between the tire cord fabrics by deformation of the tire. Further, various weaving methods capable of generating friction, such as a plain weave, a twill weave, a satin weave, or the like, may be utilized according to a weaving particular need or implementation of different materials applied.

Figure 3A:
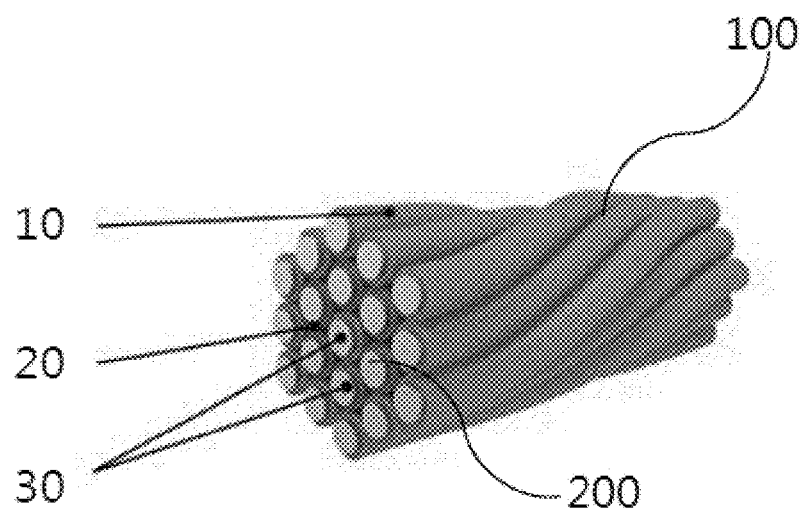
FIG. 3A is a view illustrating an example of an electrostatic energy generator using a tire cord fabric.

FIG. 3A is a view illustrating an example of an electrostatic energy generator using a tire cord fabric Referring to FIG. 3A, the electrostatic energy generator using the tire cord fabric according to an embodiment of the present application includes a first tire cord fabric 100 and a second tire cord fabric 200. Although reference numerals are assigned to 100 and 200 for convenience of description, it is apparent to those skilled in the art that the reference numerals may be interchangeable.

The first tire cord fabric 100 includes a conductive material 30 which is a wire-shaped electrode and a non-conductive material 10 which surrounds an outer peripheral surface of the conductive material 30. As illustrated in FIG. 3A, the tire cord fabric is a fabric including the conductive material 30 thereinside and the non-conductive material 10 which surrounds the conductive material 30 and having a long wire or pipe form.

The conductive material 30 has a long and thin shape such as a wire shape and any conductive material having electrical conductivity may be used as the conductive material 30. As a representative example, the conductive material 30 may include copper (Cu), aluminum (Al), silver (Ag), gold (Au), platinum (Pt), titanium (Ti), indium tin oxide (ITO), and conductive polymer (polyethylenedioxythiophene-polystyrenesulfonate (PEDOT:PSS)). The conductive material 30 may serve as an electrode.

The non-conductive material 10, which is a material capable of generating triboelectricity and static electricity due to friction with a material 20 of the second tire cord fabric 200, may use a material available for use in the tire cord such as a polyester-based material, a polymer-based material such as nylon, rayon, or the like, or a non-conductive material.

The second tire cord fabric 200 includes a conductive material 30 which is a wire-shaped electrode and a material 20 which surrounds an outer peripheral surface of the conductive material 30. The material 20 of the second tire cord fabric 200 is a different material from the non-conductive material 10 of the first tire cord fabric 100, may use all of a non-conductive material and a conductive material, and may also be used in the tire cord.

The above-described first tire cord fabric 100 and second tire cord fabric 200 are arranged to be in contact with each other in a longitudinal direction and form a bundle. Thus, friction occurs between the first tire cord fabric 100 and the second tire cord fabric 200 due to kinetic energy generated when the tire is in contact with the ground and is deformed during the driving of a vehicle, and thus triboelectricity may be generated.

In order to increase the generation of the triboelectricity, it may be preferable that charging characteristics of the material 10 of the first tire cord fabric 100 and the material 20 of the second tire cord fabric 200, that is, two friction materials, be different from each other. When charging characteristics are different from each other, they are referred to as being located at different locations on a triboelectric series. More triboelectricity may be generated as the difference between the charging characteristics is increased.

Further, in the bundle of the above-described tire cord fabrics, the first tire cord fabric 100 and the second tire cord fabric 200 are twisted. In embodiments, twisted means a form in which a plurality of threads are twisted. The bundle of the fabrics is twisted to form a thread. The threads are woven to form a sheet as illustrated in FIG. 2. The sheet is mounted on the tire as illustrated in FIG. 1. Further, the bundle of the fabrics is twisted and it becomes a structure in which more friction may occur for the tire deformation, and thus the triboelectricity may also be increased.

In order to efficiently generate the triboelectricity, it is preferable that the material 10 of the first tire cord fabric 100 and the material 20 of the second tire cord fabric 200 be different from each other. Specifically, it is preferable that any one of the first tire cord fabric 100 and the second tire cord fabric 200 be located at a center of the bundle, as illustrated in FIGS. 3A and 3B, and the other tire cord fabric be disposed on a circumference of the bundle, such that the different tire cord fabrics are disposed (e.g., alternately) in a direction of the circumference.

Thus, in a cross-sectional view of the fabric bundle, since the different tire cord fabrics are disposed for each layer from a center of a circle to the outside, the different materials of the tire cord are rubbed when the tire is deformed, and the triboelectricity may be more efficiently generated.

Figure 3B:
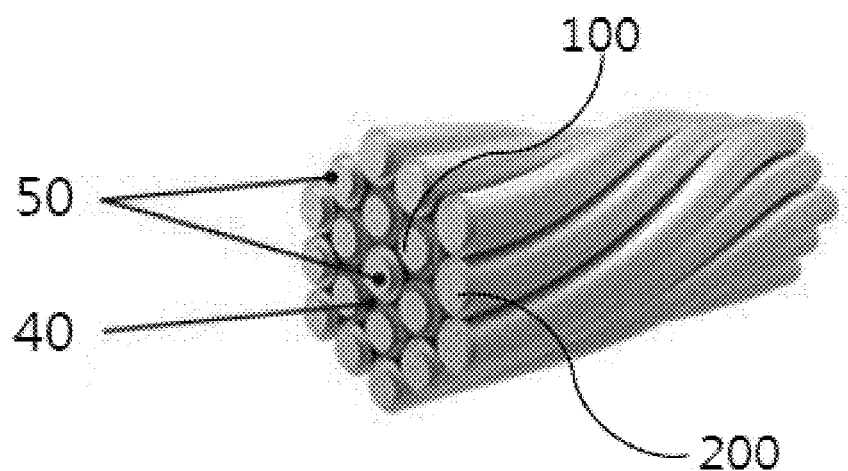
FIG. 3B is a view illustrating another example of an electrostatic energy generator using a tire cord fabric.

FIG. 3B is a view illustrating another example of an electrostatic energy generator using a tire cord fabric.

Referring to FIG. 3B, the electrostatic energy generator using the tire cord fabric according to an embodiment of the present application also includes a first tire cord fabric 100 and a second tire cord fabric 200.

The first tire cord fabric 100 includes a conductive material 50 which is a wire-shaped electrode and a non-conductive material 40 which surrounds an outer peripheral surface of the conductive material 50. As illustrated in FIG. 3B, the tire cord fabric is a fabric including the conductive material 50 thereinside and the non-conductive material 40 which surrounds the conductive material 50 and having a long wire or pipe form.

The conductive material 50 has a long and thin shape such as a wire shape. Any conductive material having electrical conductivity may be used as the conductive material 50, as there is no specific limitation with respect to the chosen material. The conductive material 50 may serve as an electrode.

The non-conductive material 40, which is a material capable of generating triboelectricity and static electricity due to friction with the second tire cord fabric 200, may utilize a material available for use in the tire cord, such as a polyester-based material, a polymer-based material such as nylon, rayon, or the like, or a non-conductive material.

The second tire cord fabric 200 includes a conductive material 50 which is a wire-shaped electrode. A material 50 of the second tire cord fabric 200 is a different material from the non-conductive material 40 of the first tire cord fabric 100. Of course, the second tire cord fabric 200 also includes a conductive material thereinside, in a form in which the conductive material may surround the second tire cord fabric 200.

The above-described first tire cord fabric 100 and second tire cord fabric 200 are arranged to be in contact with each other in a longitudinal direction and to form a bundle. Thus, friction occurs between the first tire cord fabric 100 and the second tire cord fabric 200 due to kinetic energy generated when the tire is in contact with the ground to be deformed during a driving of a vehicle, and thus triboelectricity may be generated.

In order to increase the generation of the triboelectricity, it may be preferable that charging characteristics of the material 40 of the first tire cord fabric 100 and the material 50 of the second tire cord fabric 200, that is, two friction materials, be different from each other. The charging characteristics which are different from each other are referred to be located at different locations on triboelectric series. The more triboelectricity may be generated as the difference between the charging characteristics is increased.

Further, in the bundle of the above-described tire cord fabrics, the first tire cord fabric 100 and the second tire cord fabric 200 are twisted. Further, the bundle of the fabrics is twisted and it becomes a structure in which more friction may occur for the tire deformation, and thus the triboelectricity may also be increased.

In order to efficiently generate the triboelectricity, it is preferable that the material 40 of the first tire cord fabric 100 and the material 50 of the second tire cord fabric 200 be different from each other. Specifically, it is preferable that any one of the first tire cord fabric 100 and the second tire cord fabric 200 be located at a center of the bundle, as illustrated in FIGS. 3A and 3B, and the other tire cord fabric be disposed on a circumference of the bundle, and the different tire cord fabrics be alternately disposed in a direction of the circumference.

Thus, in a cross-sectional view of the fabric bundle, since the different tire cord fabrics are disposed for each layer from a center of a circle to the outside, the different materials of the tire cord are rubbed when the tire is deformed and the triboelectricity may be more efficiently generated.

Figure 4A:
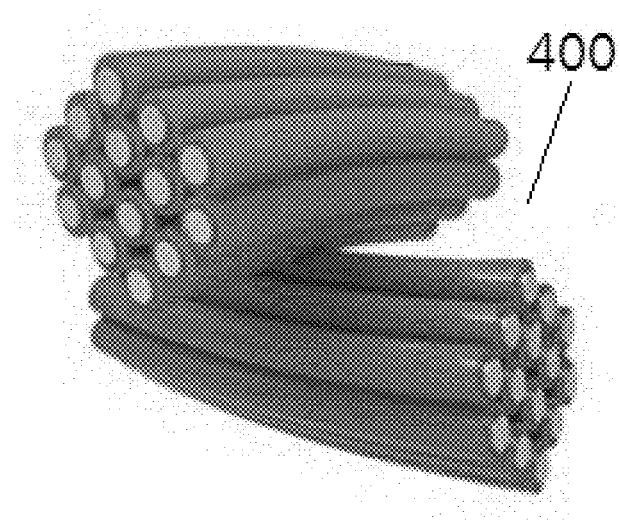
FIG. 4A is a view illustrating an example of an electrostatic energy generator using a plurality of bundles of tire cord fabric.
Figure 4B:
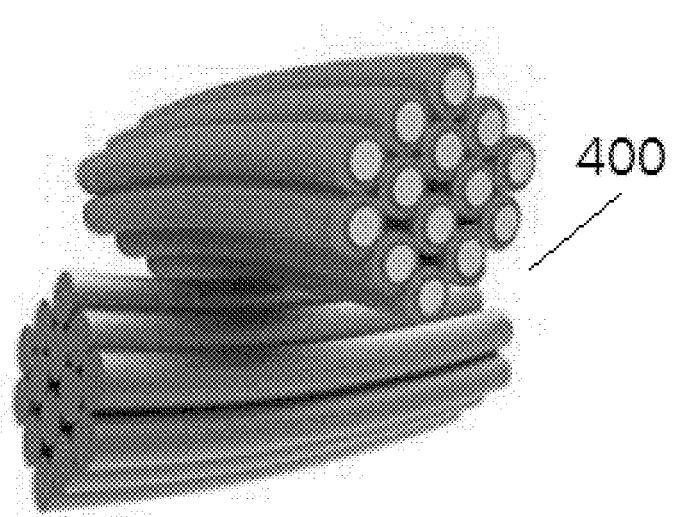
FIG. 4B is a view illustrating another example of an electrostatic energy generator using a plurality of bundles of a tire cord fabric.
Figure 5:
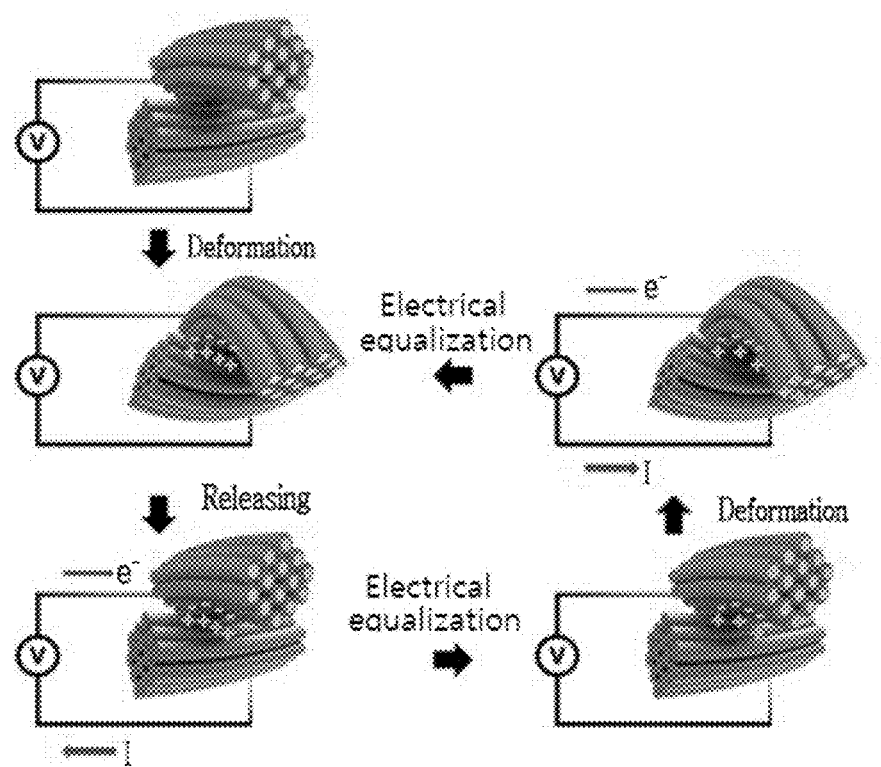
FIG. 5 is a view illustrating an example of an operating principle of an electrostatic energy generator using a tire cord fabric.

FIGS. 4A and 4B are views illustrating examples of an electrostatic energy generator using a plurality of bundles of tire cord fabric.

Referring to FIGS. 4A and 4B, the FIGS. refer to a plurality of the bundles of the tire cord fabrics described in FIGS. 3A and 3B, and are provided to depict an example of an orientation of the bundles for a generation of triboelectricity due to a friction therebetween.

As illustrated in FIGS. 4A and 4B, there is a plurality of bundles 400. The plurality of bundles 400 may be twisted, thus resulting in the form as illustrated in FIG. 2. In FIGS. 4A and 4B, the friction between the bundles as well as the friction between the tire cord fabrics described in FIGS. 3A and 3B may occur and the triboelectricity may be generated.

In an embodiment, each bundle is made of only any one of the first tire cord fabric 100 and the second tire cord fabric 200. In an embodiment, the triboelectricity may be generated due to the friction between the bundles rather than the friction between the tire cord fabrics. Such an embodiment is illustrated in FIGS. 4A and 4B. Further, in an embodiment, a bundle in which friction occurs may include different tire cord fabrics, and thereby allow for a utilization of different tire cord fabrics to maximize the efficiency of the generation of the triboelectricity.

FIG. 5 is a view illustrating an example of an operating principle of an electrostatic energy generator using a tire cord fabric according to an embodiment of the present application.

FIG. 5 is a view illustrating an example of an operating principle of an electrostatic energy generator using a tire cord fabric. Referring to FIG. 5, friction between bundles and friction between fabrics occurs according to deformation of the tire and thus triboelectricity and static electricity are generated. Ads depicted in FIG. 5, the generated triboelectricity and static electricity may be equalized between successive deformations (and subsequent releases of the deformations) of the tire.

In an embodiment, the electrostatic energy generator using the tire cord fabric according to an embodiment of the present application may be utilized as a sensor which measures air pressure of the tire.

The sensor collects electric energy generation signals generated from the electrostatic energy generator during a driving of the tire and determines whether the air pressure of the tire is normal or not. That is, when the air pressure of the tire is out of a normal range of air pressure, repeated changes of potential of the triboelectric energy generated by the friction may increase or decrease, thereby making a determination of whether the air pressure of the tire is normal or not normal determinable via a generation of a signal indicating the generated electric energy.

A tire to which an electrostatic energy generator using a tire cord fabric is applied can generate electric energy using tire deformation kinetic energy generated in a vehicle. The electric energy generated may be capable of charging a battery used in an electric vehicle or a hydrogen vehicle, as well as in an internal combustion engine, and can be utilized to increase driving mileage and fuel efficiency (e.g., km/L or km/kW). Further, tire pressure can also be measured.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure

What is claimed is:

1. An electrostatic energy generator, the generator comprising:
   one or more first tire cord fabrics each including a conductive material which is a wire-shaped electrode and a non-conductive material, the non-conductive material configured to surround an outer peripheral surface of the conductive material; and
   one or more second tire cord fabrics each including a conductive material which is a wire-shaped electrode, and a material configured to surround an outer peripheral surface of the conductive material that is different from the non-conductive material of the first tire cord fabric,
   wherein the first tire cord fabric and the second tire cord fabric are arranged in a longitudinal direction so as to be in contact with each other and to form a bundle, such that frictional electricity is generated due to a friction between the first tire cord fabric and the second tire cord fabric, and
   wherein any one of the first tire cord fabric and the second tire cord fabric is disposed on a center of the bundle and the other tire cord fabric is disposed on a circumference thereof, such that the tire cord fabrics disposed on the circumference are disposed so as to surround the tire cord fabrics thereinside.

2. The generator of claim 1, wherein the first tire cord fabric and the second tire cord fabric are twisted in the bundle.

3. The generator of claim 1, comprising a plurality of bundles, such that frictional electricity is generated due to a friction between the first tire cord fabric and the second tire cord fabric and a friction between the bundles of the plurality of bundles.

4. The generator of claim 3, wherein the bundles of the plurality of bundles are twisted with each other.

5. The generator of claim 3, wherein, in the plurality of bundles, each of the bundles is made of only any one of the first tire cord fabric and the second tire cord fabric.

6. The generator of claim 5, wherein in the plurality of bundles, each of the bundles is made of tire cord fabrics which are different from each other.

7. An electrostatic energy generator, the generator comprising:
   one or more first tire cord fabrics each including a conductive material which is a wire-shaped electrode and a non-conductive material, the non-conductive material configured to surround an outer peripheral surface of the conductive material; and
   one or more second tire cord fabrics each including a conductive material which is a wire-shaped electrode,
   wherein the first tire cord fabric and the second tire cord fabric are arranged in a longitudinal direction so as to be in contact with each other and to form a bundle, such that frictional electricity is generated due to a friction between the first tire cord fabric and the second tire cord fabric, and
   wherein any one of the first tire cord fabric and the second tire cord fabric is disposed on a center of the bundle and the other tire cord fabric is disposed on a circumference thereof, such that the tire cord fabrics disposed on the circumference are disposed so as to surround the tire cord fabrics thereinside.

8. The generator of claim 7, wherein the first tire cord fabric and the second tire cord fabric are twisted in the bundle.

9. The generator of claim 7, comprising a plurality of bundles, such that frictional electricity is generated due to a friction between the first tire cord fabric and the second tire cord fabric and a friction between the bundles of the plurality of bundles.

10. The generator of claim 9, wherein the bundles of the plurality of bundles are twisted with each other.

11. The generator of claim 10, wherein, in the plurality of bundles, each of the bundles is made of only one of the first tire cord fabric and the second tire cord fabric.

12. The generator of claim 11, wherein in the plurality of bundles, each of the bundles is made of tire cord fabrics which are different from each other.

13. A tire cord comprising the electrostatic energy generator using the tire cord fabric according to claim 1.

14. A tire comprising the tire cord of claim 13.

15. A tire pressure measurement sensor comprising the tire of claim 14,
   wherein electric energy generation signals generated from the electrostatic energy generator are collected during a driving of the tire, and
   wherein an air pressure of the tire is determined to be normal or not normal.

* * * * *